E. EMMERT.
Broadcast Seeder.
No 29,067                                   Patented July 10, 1860.
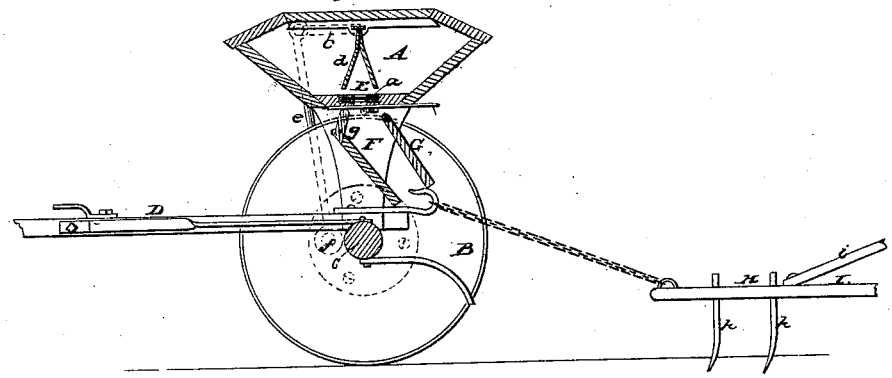
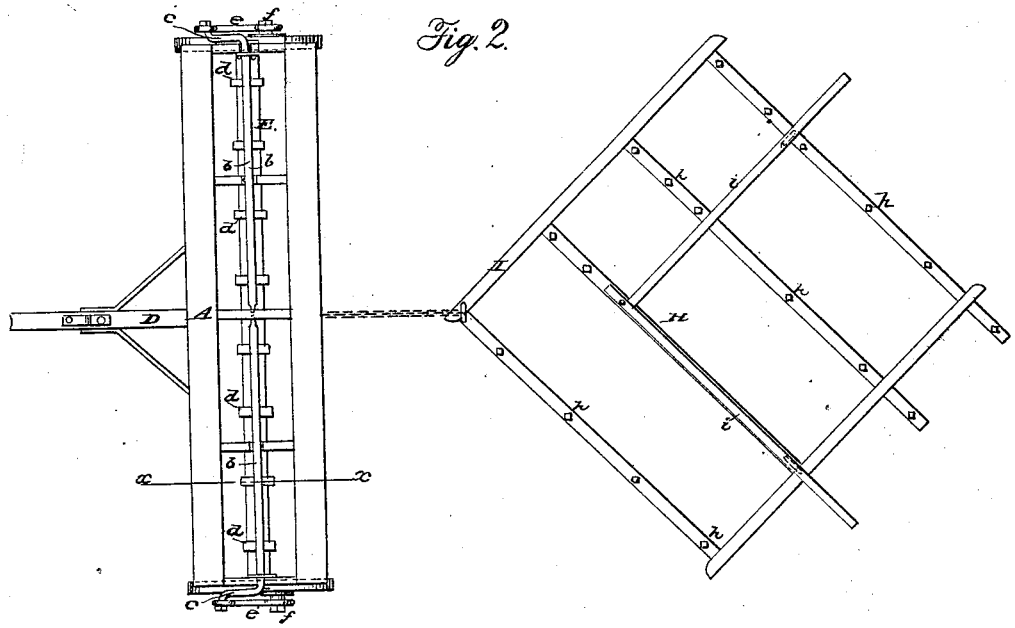

UNITED STATES PATENT OFFICE.

EZRA EMMERT, OF FRANKLIN GROVE, ILLINOIS.

IMPROVEMENT IN SEEDING-MACHINES.

Specification forming part of Letters Patent No. 29,067, dated July 10, 1860.

*To all whom it may concern:*

Be it known that I, EZRA EMMERT, of Franklin Grove, in the county of Lee and State of Illinois, have invented a new and Improved Broadcast-Seeding Machine; and I do hereby declare that the following is a full, clear, and exact description of the same, reference being had to the accompanying drawings, making a part of this specification, in which—

Figure 1 is a longitudinal vertical section of my invention, taken in the line *x x*, Fig. 2. Fig. 2 is a plan or top view of the same.

Similar letters of reference indicate corresponding parts in both figures.

My invention consists in the novel arrangement and combination of a seed-box, mounted on two wheels, and having perforations or seed-cells in its bottom, and a correspondently-perforated slide for contracting said cells, so as to regulate the discharge of seed, and of oscillating pendants or agitators for preventing the seed from becoming clogged over the seed-cells, said agitators being operated by pitmen connected with crank-shafts and crank-pins on the wheels, and of a guide-board and apron attached to the under part of the seed-box to insure an even and undisturbed distribution of the seed, and in connecting a harrow for the purpose of working in or covering the seed after it has fallen to the ground, all arranged and operating as will be hereinafter described.

To enable those skilled in the art to fully understand my invention, I will proceed to describe its construction and operation with reference to the drawings.

A represents a seed-box, which is mounted on two wheels, B B, said wheels being placed loosely on an axle, C, to which the draft-pole D is attached. The bottom of the box A is perforated with holes or seed-cells *a*, over which a correspondently-perforated slide, E, is fitted. By adjusting this slide the seed-cells may be contracted, as desired, thereby regulating the discharge.

In the upper part of the seed-box A the shafts *b* are placed longitudinally, each shaft extending half the length of the box, and having its inner bearing in a partition fitted securely within said box. These shafts *b* are placed in line with each other, and to their sides forked pendants or agitators *d* are attached, said agitators working directly over the seed-cells in the bottom of the seed-box. The outer end of each shaft *b* is provided with a crank, *c*, and both these cranks are connected by pitmen *e* with crank-pins *f* on the wheels B B.

F is an inclined guide-board, placed longitudinally with the box A, and directly under the seed-holes *a*. This guide-board may be more or less inclined by means of a rod, *g*, which has its bearings in the standards which support the seed-box, as shown clearly in Fig. 1. The seed falling from the holes *a* strikes against this guide-board and is thereby scattered, producing an even distribution of the same.

G is an inclined plate or apron, placed under the seed-box A, and fitted to swing against or nearly against the guide-board F. This apron serves to prevent the seed from being disturbed by the wind as the same is passing down the guide-board F.

To the axle C a harrow, H, is attached, the frame I of which is of the ordinary or any proper construction, and is provided with curved teeth *h*, which are bent forward, as shown clearly in Fig. 1. I find these curved teeth *h* are much superior to the straight ones, for the reason that they more readily penetrate the surface of the ground and more effectually pulverize it. I also provide the harrow with handles *i*, which handles greatly facilitate the throwing around of the harrow when turning the machine in the field.

The operation of the machine is as follows: As the machine is drawn along motion is given to the pitmen *e* by means of the crank-pins *f* on the wheels B B. The pitmen transmit an oscillating motion to the cranks *c* of the shafts *b b*. A vibrating motion is thus given to the forked pendants or agitators *d*, which prevent the seed from becoming clogged over the seed-cells. These agitators also serve as clearers to catch whatever straws or other like impediments which the seed may contain, and to bring the same away from the cells *a* up to the surface of the seed in the box A, when they can be easily removed. By pushing the slide E the cells *a* are contracted, thus regulating the discharge of seed according to the fancy of the operator. The seed after passing through the cells *a* strikes against the guide-board F, and is scattered over the same, but prevented from bounding off or being disturbed by the wind by the plate or apron G, thereby insuring an even and steady distribution from the machine equal to the entire length of the guide-board F. The harrow H now follows, turning up the ground and effectually covering the seed sown by the distributing device.

Having thus described my invention, what I claim as new, and desire to secure by Letters Patent, is—

The combination, with a seed-box, A, of the perforated slide E, pendants or agitators $d$, pitmen $e$, inclined guide-board F, plate or apron G, and harrow H, all arranged and operating substantially as herein described.

EZRA EMMERT.

Witnesses:
A. T. MURPHY,
HENRY WEBB.